United States Patent [19]

Septier et al.

[11] 4,405,545

[45] Sep. 20, 1983

[54] METHOD AND APPARATUS FOR RAPIDLY SOLIDIFYING AND COOLING MELTED PRODUCTS BASED ON METAL OXIDES BY CONTINUOUS CASTING

[75] Inventors: Louis Septier; Michel Demange, both of Le Fayet, France

[73] Assignee: Societe Francaise d'Electrometallurgie Sofrem, Paris, France

[21] Appl. No.: 342,847

[22] Filed: Jan. 26, 1982

[30] Foreign Application Priority Data

Jan. 30, 1981 [FR] France ............................. 81 02179

[51] Int. Cl.³ .................................................. B28B 1/54
[52] U.S. Cl. ............................................ 264/144; 264/332; 425/6; 425/436 R; 425/471
[58] Field of Search .................... 264/144, 332; 425/6, 425/436 R, 436 RM, 471

[56] References Cited

U.S. PATENT DOCUMENTS 2,773,753 12/1956 Stengel et al. ..................... 264/144
3,646,713 3/1972 Marshall et al. .................. 264/144 X
3,993,119 11/1976 Scott ................................. 264/297 X Primary Examiner—Philip E. Anderson
Attorney, Agent, or Firm—Dennison, Meserole, Pollack & Scheiner

[57] ABSTRACT

A method and apparatus is disclosed for rapidly solidifying and cooling molten metal oxides, by continuous casting, which according to the invention, comprises: feeding the molten metal oxides into the convergent space formed between two cylinders mounted for rotation about horizontal axes and rotated in opposite directions, i.e., counter-rotating, at a substantially equal peripheral speed, the distance between their axes being equal to the sum of the radius of each cylinder plus at least about one millimeter; cooling the walls of the cylinders to enable solidification of the molten material; controlling the rotary speed of the cylinders so that the molten metal oxide is not completely solidified until it reaches a point beyond a plane passing through the axes of rotation of the cylinders, and retrieving a solidified metal oxide product from the divergent space formed between the cylinders. The method is particularly suited to the production of fine grain abrasives of a corundum or courndum-zirconia base.

25 Claims, 10 Drawing Figures

METHOD AND APPARATUS FOR RAPIDLY SOLIDIFYING AND COOLING MELTED PRODUCTS BASED ON METAL OXIDES BY CONTINUOUS CASTING

BACKGROUND OF THE INVENTION

The invention concerns a method and apparatus for rapidly solidifying and cooling molten metal oxides and metal oxide-base compositions by continuous casting.

In many industrial processes an attempt is made to obtain rapid solidification and cooling of melted products based on metal oxides, for reasons either of safety or of convenience: for example, when exhausted drosses or slags from electro-metallurgical operations have to be taken rapidly to the tip without the risk of transporting them in the liquid or partially solidified state, or for structural reasons, when rapid cooling is necessary to give the product certain physical properties. For example, abrasives based on corundum and on corundum and zirconia are known to have mechanical properties which improve commensurately with the rapidity with which the molten product, manufactured by fusion in an electric furnace, is cooled. This fact has been pointed out particularly in French Pat. No. 1 332 975 in the name of CARBORUNDUM Company, which recommends casting in a graphite mold, in French Pat. No. 2 127 231 in the name of PECHINEY directed to casting the melted product onto steel balls, in French Pat. No. 2 133 595 in the name of TREIBACHER CHEMISCHE WERKE AG directed to casting onto iron spheres, and in French Pat. No. 2 166 082 in the name of NORTON directed to casting between solid metal plates 1.6 to 12.7 mm apart.

For obvious reasons it would be desirable for the rapid cooling to take place continuously. In the case of drosses and slags, as a matter of fact, cooling in ingot molds, which is the usual practice, is very slow and necessitates a large number of molds, which take up space in the workshop. In the case of abrasives with fine crystallization, casting between closely spaced metal plates or onto steel balls leads to very low productivity.

A certain number of processes for cooling rapidly by continuous casting have previously been described.

French Pat. No. 1 319 102 to NORTON describes the casting of electro-melted alumina, in a thin layer, onto a hollow cylinder which is cooled by sprinkling water onto its internal surface.

U.S. Pat. No. 3,993,119, and French Pat. No. 2 290 266 to NORTON, describe an arrangement for casting between stationary, thick metal plates, through their base onto an endless conveyor. The conveyor passes over rollers which causes the plates to move apart and the blocks of cooled abrasive to be separated and drop into a receiving means.

French Pat. No. 2 422 462 to NORTON describes another arrangement for continuous casting between cooled metal belts which are kept in contact with the solidifying abrasive by a series of guiding rollers.

These various pieces of apparatus are mechanically complex and ill adapted to cheap, continuous mass production of electro-melted abrasives with fine crystallization.

BRIEF SUMMARY OF THE INVENTION

The present invention is based on the use of at least two cooled, horizontal cylinders mounted for rotation about parallel horizontal axes as a means for cooling electro-melted products.

The method of rapidly solidifying and cooling melted products based on metal oxides, by continuous casting, according to the invention, comprises: feeding the melted product into the convergent space formed by two horizontal cylinders, turning in opposite directions at a substantially equal peripheral speed, the distance between their axes being equal to the sum of the radius of each cylinder plus at least about one millimeter, cooling the walls of the cylinders, controlling the rotary speed of the cylinders so that the melted product is not completely solidified until it passes beyond an imaginary plane passing through the axes of rotation of the cylinders, and retrieving the solidified product from the divergent space formed between the cylinders.

The apparatus for carrying out the method in a preferred embodiment essentially comprises a controllable feed for the molten product, two metal cylinders mounted for rotation with their axes parallel and substantially horizontal, adapted to be rotated in opposite directions at a substantially equal peripheral speed, the distance between their axes being equal to the sum of the radius of each cylinder plus at least about one millimeter, at least one cooling means and means for setting the cylinders into snychronous rotation, in opposite directions and at a controllable speed, and a means for retrieving the solidified product.

DETAILED DESCRIPTION OF THE INVENTION

Figure 1:
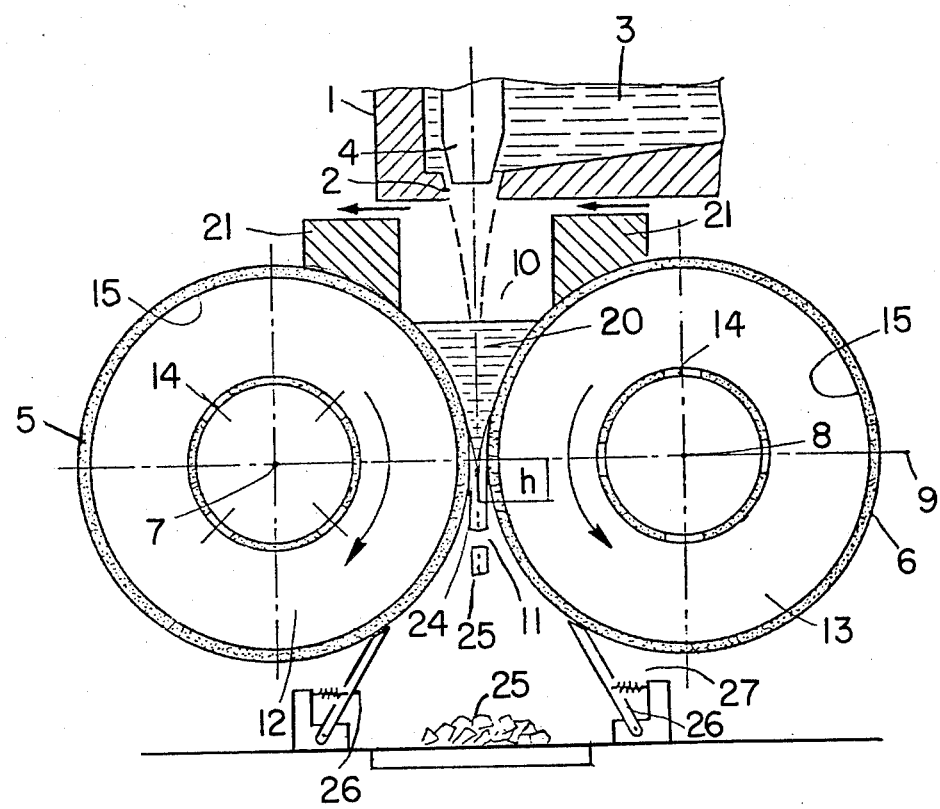
FIG. 1 is a vertical section through an apparatus for carrying out the method of the invention.

The melted product to be solidified may come directly from a melting furnace 1 or from a storage means, such as a ladle, only the lower part of which has been shown.

At the lower part of the furnace 1 there is a casting orifice 2, which can be sealed by any known means and which is preferably made of graphite or possible refractory material. The molten product 3 flows through the orifice 2 by actuating a sealing plug 4.

A means for rapid, continuous cooling comprises two cylinders 5 and 6, the respective longitudinal axes 7 and 8 of which are parallel and substantially horizontal. An imaginary plane 9 passing through the axes 7 and 8 is horizontal in the case shown, but this arrangement is not indispensable, as can be seen from FIGS. 7a, 7b, 7c and 7d. The cylinders are arranged with a space of at least about one millimeter between them at the closest point, that is to say, in the plane 9 of their axes so as to form a molten product receiving trough therebetween. This distance may be increased, according to the type of product being cast, e.g. up to 10 to 20 millimeters, although the invention is not restricted to this particular value.

The two cylinders 5 and 6 are set in synchronous rotation in opposite directions, i.e., counter-rotated, in the directions of the arrows by a drive means including a dynamic means of any known type which will enable the speed of rotation to be varied. One of the cylinders may be mounted on resilient bearings.

The two cylinders 5 and 6 thus define between them a convergent space 10, or trough into which the molten product to be cooled is introduced, and a divergent space 11 in which the solidified product is retrieved.

The two cylinders 5 and 6 are made of a material, such as of metal, which is a good conductor of heat, and they must have good mechanical strength. It is possible to fabricate the cylinders from steel, pure copper or preferably copper alloy, which has its hardness increased by known alloying constituents such as iron, cadmium, chromium or again copper steel or copper covered with a band of steel. The cylinders also may be solid, in which case cooling can be effected only by spraying or sprinkling them externally with water and avoiding any contact between the water and the molten product or they may, prefereably, be hollow and have internal cooling means and optional external cooling means.

The internal part of each cylinder comprises a chamber 12, 13 with water or other suitable cooling fluid circulating through it. The fluid is introduced and discharged through a plurality of holes 14, so as to provide effective and uniform cooling for the walls 15.

The two ends of the convergent space 10 into which the product to be solidified is fed have to be sealed. This can be done by providing an end wall member 16, see FIG. 4, of larger diameter at both ends of each of the cylinders, the member 16 coming into sealing contact with the enlarged diameter of the opposite cylinder. However, this arrangement definitively fixes the spacing between the cylinders, which may not be acceptable for all modes of operation. A different sealing method, see FIG. 5, comprises fitting the opposed ends of each cylinder with a disc 17 which is large enough in diameter to provide a rotary frictional seal relative to the opposite cylinder end.

Figure 6:
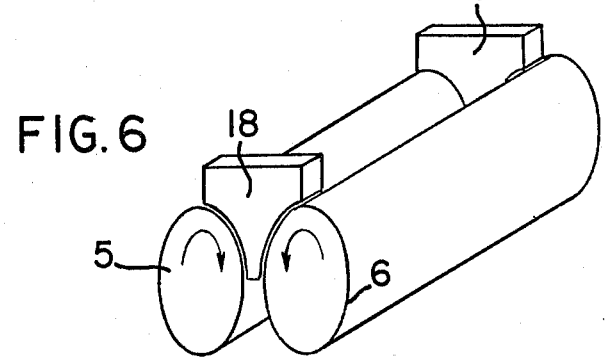

FIG. 6 schematically illustrates another means, comprising two stationary sealing members 18, preferably made of graphite or a compact or fibrous refractory material, for sealing the ends of the molten material receiving trough formed between the cylinders 5 and 6.

FIGS. 7a–7d show various exemplary arrangements of the cylinders, e.g., 7a with the plane of the axes horizontal, 7b with the plane of the axes slightly inclined, 7c inclined at about 45° and 7d substantially vertical. With respect to 7a and 7b the molten product may simply be cast into the convergent space or trough between the cylinders. With respect to FIGS. 7c and 7d it is necessary to feed it in through a nozzle 22 which sealingly engages the opposed cylinders.

In the various cases the cylinders are preferably theoretically of the same diameter. Since they rotate synchronously they will have an equal peripheral speed. If this speed were different for each cylinder there would be friction between the less rapid cylinder and the solid product, with excessive wear. It would also be possible for the two cylinders to be of unequal diameters and for the speed of rotation to be controlled individually so as to obtain an equal peripheral speed, although this arrangement does not appear to have any special advantages.

The diameter of the cylinders and their length may be chosen between relatively broad limits, and the invention is not restricted to these. The diameter may range from one to a few tens of centimeters to one meter and more, and the length may be up to and even over one meter. The upper limits will often be fixed by the available facilities for construction and machining the surface of a cylinder. Generally speaking, however, cylinders of large diameter will be more suitable for precise control of the height of the molten product 20 in the convergent space 10.

In FIG. 1 the liquid product is fed into space 10 simply by letting it flow by gravity. The rate of flow is controlled so as to keep the liquid product 20 at a substantially constant height in the convergent space 10. Two lateral gates 21 limit the danger of having too large a surface of contact between the wall of the cylinders and the liquid product 20, in the case of the liquid level rising excessively. This would result in premature solidification of the product, which would make the apparatus seize up.

In cases where the product has to be solidified in the absence of a reactive atmosphere, e.g., away from air, as with electro-molten abrasives based on corundum or corundum zirconia, circulation of inert or reducing gas may be provided in the convergent space 10. This is symbolized by the two arrows above the gates 21.

Figure 2:
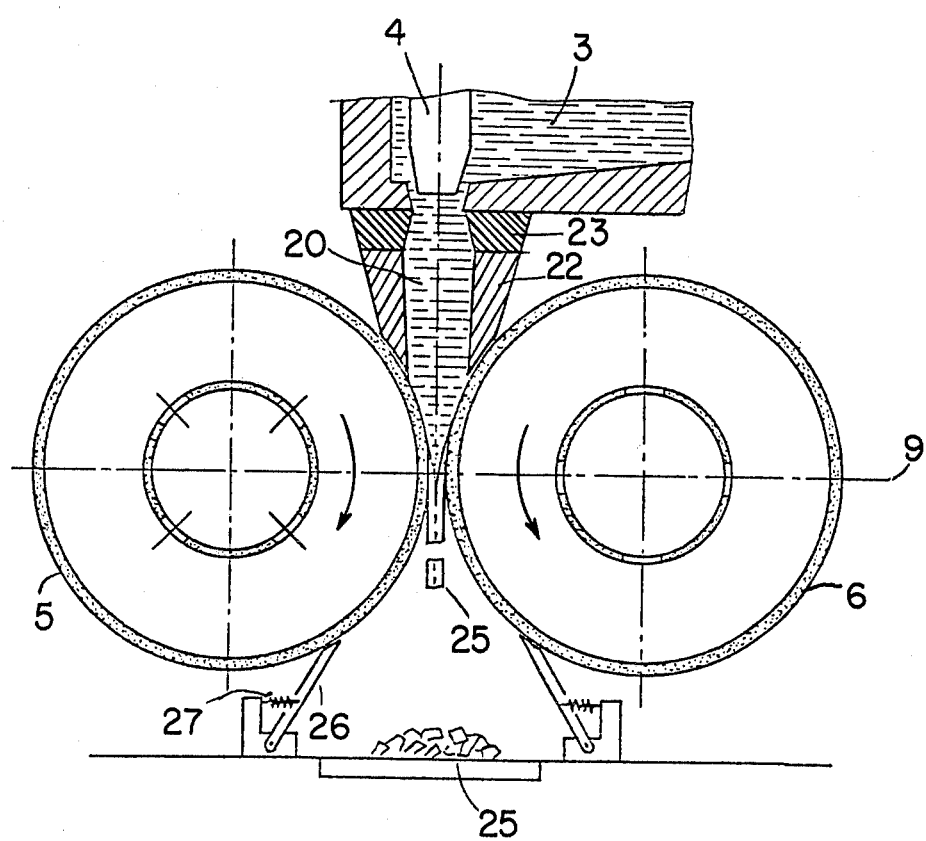
FIG. 2 shows an apparatus similar to that of FIG. 1 with a modified feed for the melted product.
Figure 7A:
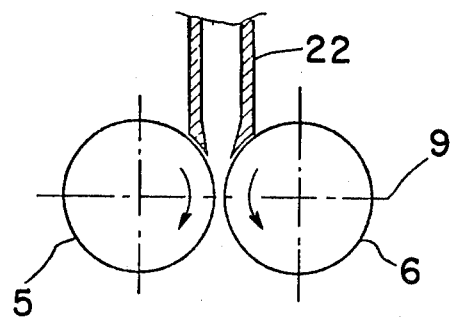
FIGS. 7a, 7b, 7c and 7d show four alternate arrangements of two cylinders in accordance with the present invention.

Another means of casting the melted product so as to prevent it from coming into contact with the atmosphere comprises using a nozzle 22, see FIGS. 2 and 7a which molten liquid-sealingly bears on the walls of the cylinder with a gentle, tight friction. This nozzle 22 is preferably made of graphite, and in FIG. 2 the upper part 23 may be made of a flexible or elastic material.

Figure 3:
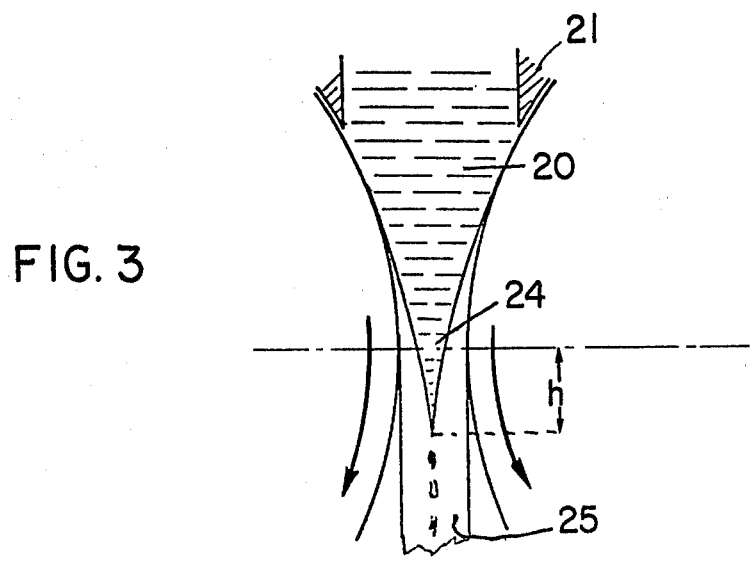
FIG. 3 is a schematic showing of details of the solidification method of the present invention.

As will be appreciated from FIG. 3 the apparatus operates as follows: The common speed of the cylinders and the flow rate of the cooling water are controlled so that there is still a liquid film of molten product 20, 24, i.e., the common plane of the axes of rotation of the cylinders. This film must be thick enough to allow the already solidified "walls" of the solidified product 25 to be deformed, and not too thick to prevent the liquid from "leaking" or flowing downwardly. The film of molten product extends a vertical distance h below the plane 24 of the axes of the cylinders 5 and 6, and this distance h must not be less than about one centimeter. When the apparatus starts up, and particularly if there is a large gap between the rollers, it may be advantageous to seal the space between the rollers with a means such as asbestos braiding (not shown), which will be forced out of the nip of the cylinders as soon as they start turning.

Shortly after making contact with the cold surface of the cylinders, the molten material becomes partly solidified and is carried downwards by the rotation of the cylinders. A very important feature of the invention resides in the rotary speed of the cylinders being controlled as a function of the cooling power of the apparatus so that, in the zone of minimum distance between the cylinders, i.e., the zone defined by the two generatrices of the cylinders located in the horizontal plane of the axes of rotation, part of the product is still in the liquid state. The liquid thus comprises a film in the central zone of the partly solidified product. This film allows the two solid layers that encase it to come together and bond and pass between the cylinders. This would not be possible if solidification were completed when the material reached the zone of minimum distance between the cylinders, since the solid material obtained is generally speaking hardly malleable or completely unmalleable.

The solidified product is retrieved in the divergent space 11 between the two cylinders downstream of the plane 24. According to its nature the solidified product 25 will spontaneously break into blocks of variable dimensions, or it may remain in slab form. The solidified product 25 may be retrieved by any conventional means (not shown), such as a receiving hopper or conveyor belt, or it may drop directly into a crusher or grinder.

In addition, as shown in FIGS. 1 and 2, two rakes or scrapers 26 which are held against the cylinders by resilient means, e.g., springs, may eliminate any traces of solidified product which are left adhering to the outer wall of the cylinders 5 and 6.

Finally, the apparatus may comprise a means for accelerated cooling of the solidified product by sprinkling or spraying on water, and a means for additional cooling of the cylinders, by sprinkling the outer wall, followed by a drying means to guarantee that the wall will be completely free from any trace of water when it reaches the casting zone.

SPECIFIC EXAMPLES

EXAMPLE I

A first embodiment of the apparatus according to the invention is constructed, comprising two hollow copper cylinders, 126 mm in diameter and 300 mm long, arranged so that their axes are parallel, in a horizontal plane and 130 mm apart.

With the apparatus set to a rotary speed of 4.5 revolutions per minute and with water flowing into each cylinder at 40 liters per minute, approximately 6 kg per minute of corundum zirconia containing 20% of $ZrC_2$ and 68% of $Al_2O_3$ was solidified. On leaving the cylinders, the product spontaneously breaks into polygonal pieces with a 3 to 15 mm edge on a thickness of 4 mm. Some pieces break in the median plane of the solidified product 25, i.e., the shrinkage hole or void. There is thus very good preparation for a subsequent crushing process.

EXAMPLE II

In another embodiment of the invention there are two steel cylinders 350 mm in diameter and 1000 mm long. Their parallel axes, which are contained in the same horizontal plane, are 354 mm apart. They are rotated at a speed of 3.5 revolutions per minute.

Figures 4, 5:
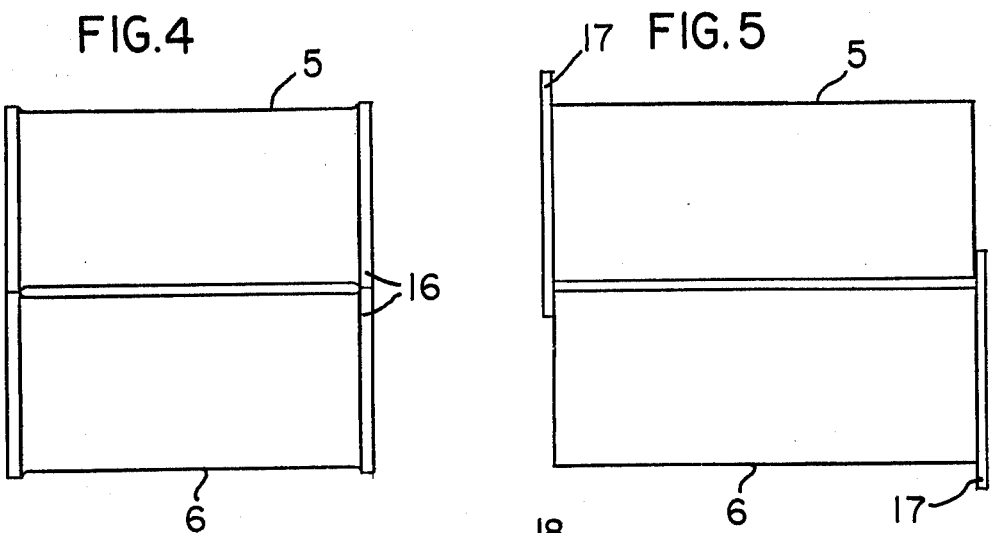
FIGS. 4, 5 and 6 show means for sealing the ends of a trough formed between two horizontal cylinders.

The cylinders are fitted at one end with a cheek plate 450 mm in diameter, e.g., see FIG. 5, also made of steel. The cylinders are placed heat to foot alongside, so that the cheeks provide a lateral limit to the free space between the cylinders. Each cylinder is cooled by circulating 200 liters of cold water per minute.

42 kg per minute of corumdum zirconia containing 25% $ZrO_2$ and 75% of alumina is solidified in thin sheets on this apparatus.

EXAMPLE III

A further embodiment comprises two copper cylinders 1000 mm long and 346 mm in external diameter. These are covered with two sleeves made of hard quenched steel, 2 mm thick and 350 mm in external diameter, which are fitted on hot. The copper cylinders are stiffened internally by copper fins arranged in diametric planes.

The fins also encourage heat exchange between the metal of the cylinder and the cooling water. The cylinders are fitted with steel cheeks 450 mm in diameter, as shown in FIG. 5.

Figure 7B:
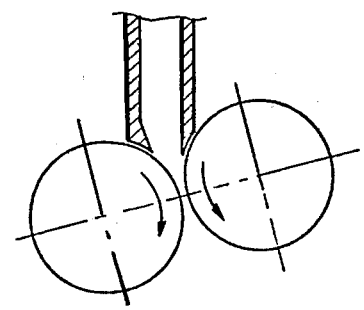
Figure 7C:
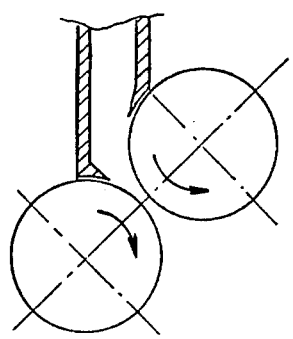
Figure 7D:
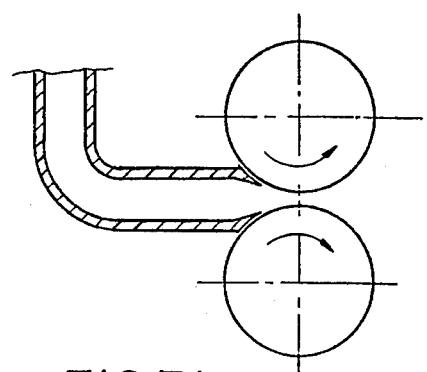

The horizontal, parallel axes of these cylinders are contained in an oblique plane inclined at 25° to the horizontal, as generally illustrated in FIG. 7b, and are spaced 355 mm apart.

This arrangement improves the feed of liquid corundum-zirconia to the machine. With the cylinders rotating at 3 revolutions per minute and cooling water being supplied at 220 liters per minute per cylinder, it has been possible to solidify corundum-zirconia, containing 25% of $ZrC_2$, continuously at a rate of 48 kg/minute.

The invention applies more particularly to rapid solidification and cooling, by a continuous casting technique, of non-metallic melted products based on metal oxides, with a melting point of up to 2000° C. This is the case with respect to white corundum, i.e., pure electromelted alumina; black corundums i.e., electro-melted alumina containing a few percent of impurities, such as oxides of iron, titanium and silicon; corundum-zirconia; metallurgic drosses and slags based on lime, silica, magnesia, alumina; various metal oxides with melting points between 1000° and over 2000° C.; and special abrasives based on alumina and aluminium oxycarbides.

We claim:

1. A method for rapid solidification and cooling of a melted metal oxide-base product by continuous casting comprising the steps of:
   (a) feeding the melted product into a convergent space formed between two juxtaposed cylinders of predetermined radius thereby forming a pool of melted product above the nip of the cylinders, said cylinders having axes of rotation parallel and substantially horizontal, the distance between the axes being equal to the sum of the radius of each cylinder plus at least about one millimeter;
   (b) cooling the walls of the cylinders;
   (c) counter-rotating the cylinders at a substantially equal peripheral speed;
   (d) altering the peripheral speed and cooling of the cylinders so that the melted product is not completely solidified until it passes beyond a plane passing through the axes of rotation of the cylinders; and
   (e) retrieving solidified product from a divergent space formed between the cylinders on the side opposite the convergent space.

2. The method of claim 1, wherein the two cylinders are of equal diameters and are rotated at the same speed.

3. The method of claim 1, wherein the two cylinders are of unequal diameters and are rotated at unequal speeds, so that their respective peripheral speeds are equal.

4. The method of claim 1, wherein the cylinders are hollow, and the internal walls thereof are cooled by circulating a fluid.

5. The method of claim 4, wherein the internal walls of the cylinders are cooled by circulating water.

6. The method of claim 1, 2, 3, 4 or 5, wherein the external walls of the cylinders are cooled by spraying water thereon, and any trace of water on the walls is then removed before the walls are contacted with the melted product.

7. The method of claim 1, 2, 3, 4 or 5, wherein the convergent space into which the melted product is fed is provided with an inert atmosphere.

8. The method of claim 1, 2, 3, 4 or 5, wherein the convergent space into which the melted product is fed is substantially leakproof.

9. The method of claim 1, 2, 3, 4 or 5, wherein before the introduction of the melted product is started into the convergent space between the two cylinders the space is sealed with a temporary sealing means which is displaced when the cylinders are set in rotation.

10. Apparatus for rapidly solidifying and cooling melted products based on metal oxides, comprising in combination:
  (a) means for providing a controllable feed of melted product;
  (b) means for providing in a convergent space a pool of melted product comprising two juxtaposed cylinders mounted for rotation with the axes of rotation parallel and substantially horizontal and spaced to provide a nip above which is formed said pool of melted product, the distance between the axes of rotation being equal to the sum of the radius of each cylinder plus at least about one millimeter;
  (c) means for setting the cylinders in synchronous rotation, at a substantially equal peripheral speed;
  (d) means for altering the rotary speed of the cylinders;
  (e) at least one means for cooling the walls of the cylinders;
  (f) means defining a divergent space formed between the cylinders on the side opposite the convergent space;
  (g) a means for retrieving the solidified product.

11. The apparatus of claim 10, including a means for accelerated cooling of the solidified product.

12. The apparatus of claim 10 or 11, including hollow cylinders and means for cooling internal walls of the cylinders.

13. The apparatus of claim 10 or 11, including means for cooling the external walls of the cylinders.

14. The apparatus of claim 13, wherein cooling for the external walls of the cylinders is provided by means for projecting water thereonto, and means is provided for removing any trace of water from the external walls before they come back into contact with the melted product.

15. The apparatus of claim 10, 11 or 14, including means operatively positioned in the divergent space between the rollers for raking the external walls of the cylinders.

16. The apparatus of claim 10, 11 or 14, including sealing means arranged at both ends of the cylinders.

17. The apparatus of claim 10, 11 or 14, including means for circulating an inert or reducing gas, in the convergent space between the cylinders.

18. The apparatus of claim 10, 11 or 14, including means for sealing the convergent space between the cylinders.

19. The apparatus of claim 10, 11 or 14, including means for crushing the solidified product.

20. The apparatus of claim 10, 11 or 14, wherein a plane passing through the axes of rotation of the cylinders is substantially horizontal.

21. The apparatus of claim 10, 11 or 14, wherein a plane passing through the axes of rotation of the cylinders is inclined to the horizontal at an angle of less than about 45°.

22. The apparatus of claim 10, 11 or 14, wherein a plane passing through the axes of rotation of the cylinders is inclined to the horizontal at an angle of from about 45° to about 90°.

23. The apparatus of claim 21, including nozzle means sealingly engaged with the cylinders for feeding liquid product into the convergent space between the cylinders.

24. The apparatus of claim 10, wherein at least one of the cylinders is mounted on resilient bearings.

25. The apparatus of claim 22, including nozzle means sealingly engaged with the cylinders for feeding liquid product into the convergent space between the cylinders.

* * * * *